United States Patent [19]

Dietz

[11] Patent Number: 5,165,518

[45] Date of Patent: Nov. 24, 1992

[54] CONVEYOR SYSTEM FOR TIMBER PRODUCTS

[75] Inventor: Hans Dietz, Ammerbuch, Fed. Rep. of Germany

[73] Assignee: Wurster u. Dietz GmbH u. Co., Tübingen-Derendingen, Fed. Rep. of Germany

[21] Appl. No.: 649,852

[22] Filed: Feb. 1, 1991

[30] Foreign Application Priority Data

Feb. 2, 1990 [DE] Fed. Rep. of Germany ....... 4003024

[51] Int. Cl.⁵ .............................................. B65G 47/26
[52] U.S. Cl. ................................. 198/457; 198/689.1; 198/836.2; 144/242 E; 144/242 M; 144/245 R; 144/376
[58] Field of Search ............... 198/689.1, 457, 836.2; 144/242 E, 242 M, 245 R, 376; 83/451, 422

[56] References Cited

U.S. PATENT DOCUMENTS

| | | | |
|---|---|---|---|
| 4,214,744 | 7/1980 | Evans | 198/836.2 X |
| 4,340,137 | 7/1982 | Foster | 198/457 |
| 4,345,496 | 8/1982 | Pearl | 83/422 X |
| 4,507,998 | 4/1985 | Lambert et al. | 83/422 X |
| 4,778,044 | 10/1988 | Kondo | 198/464 |
| 4,823,851 | 4/1989 | Seffens | 198/457 X |
| 4,945,797 | 8/1990 | Hahn | 83/422 X |

FOREIGN PATENT DOCUMENTS

3225121 7/1982 Fed. Rep. of Germany .
3418801 5/1984 Fed. Rep. of Germany .
8914111 11/1989 Fed. Rep. of Germany .
142097 12/1972 United Kingdom .

*Primary Examiner*—Robert P. Olszewski
*Assistant Examiner*—Cheryl L. Gastineau
*Attorney, Agent, or Firm*—Kokjer, Kircher, Bowman & Johnson

[57] ABSTRACT

A conveyor system serves for conveying timber products, in particular boards (13) having at least one flat side. The conveyor system (10) comprises a transverse conveyor and a linear conveyor (11) the conveying direction (14) of which include between them an angle of substantially 90° in a horizontal plane. The transverse conveyor is arranged upstream of the linear conveyor (11) in the conveying direction. It is adapted for feeding the timber products in a direction perpendicular to their longitudinal extension and for transferring them to the linear conveyor (11) at a transfer station. The linear conveyor (11) comprises, in the area of the transfer station, at least one linear conveyor (28) gripping the downstream end of the timber product, at least one vacuum jack (26, 27) acting on the middle portion of the timber product from below, at least one jack roller (50, 51, 52) arranged above the vacuum jack (26, 27) and capable of being pivoted in upward direction, away from the timber product, and a sequence control unit for actuating the transverse conveyor, the linear conveyor (28) and the jack roller (50, 51, 52) (FIG. 1).

15 Claims, 5 Drawing Sheets

CONVEYOR SYSTEM FOR TIMBER PRODUCTS

The present invention relates to a conveyor system for timber products having at least one flat side, in particular boards, the system comprising a transverse conveyor and a linear conveyor the conveying directions of which include between them an angle of substantially 90° in a horizontal plane, and the transverse conveyor being arranged upstream of the linear conveyor in the conveying direction, and being adapted for feeding the timer products in a direction perpendicular to their longitudinal extension and for transferring them to the linear conveyor at the transfer station.

Conveyor systems of the before-described type have been known from document DE-U-89 14 111. They are employed, for example, in timber mill plants for conveying timber products from one working station to the next.

For the purposes of the present invention, the term timber products will be used to describe products having at least one flat side. Such products consist typically of boards or blocks which, having been cut out from a trunk by means of a circular saw or a log frame saw, are to be conveyed to another sawing unit, via the transverse conveyor and the linear conveyor, for trimming, i.e. for cutting off the rough edges. However, the conveyor system according to the invention may of course also be used for transporting other timber products having one flat side, for example flattened trunks or timber sections of square or any other cross-sectional shape, as required under the particular circumstances.

As has been mentioned before, it is typical for conveying systems of the kind of interest for the present purposes that the conveying direction is changed by 90°. This is due to the fact that the boards are transported on the transverse conveyor in a direction perpendicular to their longitudinal extension, and are then taken over at the transfer station by the linear conveyor for being delivered to the trimming saw in the longitudinal direction. As a result, the boards are arranged more or less closely one beside the other, by their longitudinal sides, on the transverse conveyor, while on the linear conveyor they follow each other closely by their narrow sides. In order to effect this, a clocked control is required which ensures that the "leading" board will be transferred from the transverse conveyor to the linear conveyor only after the board that has been transferred before has been carried off by the linear conveyor a sufficient distance so that the next board can be taken over by the linear conveyor.

It has been found in practice that the described transfer from the transverse conveyor to the linear conveyor is difficult to control for various reasons so that the overall conveying capacity is limited at this point due to the fact that for safety reasons one leaves ample time between the individual transfer operations from the transverse conveyor to the linear conveyor in order to be absolutely sure that the boards will not overlap each other on the linear conveyor as this would cause trouble in the subsequent trimming unit. In practice this has the result that the flow of boards transported by the linear conveyor is characterized by large free spaces between the individual boards.

Now, it is the object of the present invention to improve a conveyor system of the before-described type in such a way that the transfer from the transverse conveyor to the linear conveyor can be effected with maximum rapidity and that the boards follow each other at practically no or—when the trimming machine has to be reset—only small distances between their adjacent narrow sides.

This object is achieved, on the one hand, by an arrangement where the linear conveyor comprises, in the area of the transfer station a) at least one linear conveyor means gripping the downstream end of the timber product, b) at least one support supporting the middle portion of the timber product from below, c) at least one jack roller arranged above the said support and capable of being pivoted in upward direction, away from the timber product, and d) a sequence control unit for actuating the transverse conveyor, the linear conveyor means and the jack roller.

On the other hand, the object underlying the invention is further achieved for a conveyor means of the type described above by an arrangement where the linear conveyor comprises, in the area of the transfer station a) at least one linear conveyor means gripping the downstream end of the timber product, b) at least one vacuum holding means acting on the middle portion of the timber product from above, c) at least one pressure roller arranged for being pivoted away from the timber product in downward direction, d) a sequence control unit for actuating the transverse conveyor, the linear conveyor means and the pressure roller.

This solves the object underlying the invention fully and perfectly.

Due to the fact that in any case the first board entering the area of the transfer station will come to rest on the support—or in the case of the "upside down solution" will be fixed by the vacuum holding means—and will then be gripped in both cases by the linear conveyor means by its downstream end for being carried off, while on the other hand the jack rollers or pressure rollers are pivoted away from the timber product, the next board can be transferred already while the rear end of the first board is still present in the rear of the support or the holding means, and this even if the downstream end of the next board should initially overlap the upstream, rear end of the first board. This is possible because the latter will be carried away underneath the board transferred last, and as a result the downstream end of the latter will slide off the upstream end of the board transferred first so that the two boards will come to lie one immediately adjacent the other in the conveying direction of the linear conveyor. By actuating the jack rollers or the pressure rollers, it is possible in this connection, on the one hand, to provide lateral access for an additional board or, or on the other hand, to produce the pressure required for holding the boards.

The conveying system according to the invention, therefore, provides a practically uninterrupted flow of boards on the linear conveyor, thus permitting optimum utilization of the conveying capacity of the conveyor system. The conveyor system according to the invention is capable, for example, of transferring in each minute between 40 and 60 boards having a length of 4 meters each.

According to a preferred embodiment of the invention, the support takes the form of a vacuum jack and the latter preferably has the design of vacuum boxes with slots provided in their upper faces.

This feature provides the advantage that in the case of the embodiment using the support the timber products can be fixed more effectively and that leakage losses are minimized by dividing the unit into several boxes. For, when a board has been carried off the vacuum jack means only in part, leakage air will enter only those axially defined boxes which are clear of any boards, while the remaining boxes will continue to hold the board down at full vacuum.

In this connection, an arrangement is particularly preferred where the intake slots are delimited by axial cutter blades on which the timber products are supported.

This feature provides the advantage that, on the one hand, the frictional resistance between the boards and the vacuum boxes is kept as small as possible, while on the other hand the cutter blades provide the advantage that they act to align the boards in the axial direction and to retain the boards in their conveying direction once assumed.

According to other preferred embodiments of the invention, the linear conveyor further comprises, in the area of the transfer station, a linear conveyor device gripping the upstream end of the timber product.

This feature provides the advantage that after transfer of the boards the latter can be driven both downstream and upstream of the vacuum boxes. Preferably, the additional conveyor means is of switched design in order to ensure that a subsequent board, which has its downstream end overlapping the upstream rear end of the preceding board, will not be driven itself by its upstream end as long as its downstream end has not come fully clear of the preceding board. Only when this condition has been reached, will the additional linear conveyor means be switched on in order to carry the subsequent board along the linear conveyor as quickly as possible, this being the more important as the downstream end of the subsequent board is still substantially supported on the vacuum boxes which do not produce a conveying effect of their own.

Another preferred variant of the invention, therefore, provides that the vacuum jack means and at least one of the linear conveyor means overlap each other in the conveying direction of the linear conveyor. This feature provides the advantage that any transferred board can simultaneously be held down by vacuum and conveyed by means of the linear conveyor means.

Although the location of the jack rollers in the conveying direction can be optimized under different aspects, it is particularly preferred to provide one, two or three jack rollers, a first jack roller being preferably provided at the upstream end, a second jack roller being provided in the middle of the longitudinal extension, and a third jack roller being provided at the downstream end of the vacuum jack means.

It is thus possible in an advantageous manner to manipulate the transfer or conveying process in a purposeful manner, for example by controlling the jack rollers separately with a view to assisting the transfer or conveying process in the best possible manner.

According to other preferred embodiment of the invention, the linear conveyor is provided with at least one aligning means in the manner known from document U.S. Pat. No. 4,778,044.

This feature provides the advantage that the transferred boards can simultaneously be aligned in their longitudinal direction so that they can then be carried on in the conveying direction at high speed without deviating laterally from the predetermined conveying direction.

Preferably, a first aligning device is arranged at the upstream end of the vacuum jack means.

This feature provides the advantage that the board that has been transferred later and which initially rests on the linear conveyor only by its upstream end, can be properly aligned already at this point, while its downstream end still rests on the board that has been transferred before.

Consequently, it is provided according to certain other variants of the invention that a second aligning device is arranged at the downstream end of the vacuum jack means.

This feature serves the purpose that after the upstream end of the board transferred later has been aligned by the first aligning means, its downstream end can be aligned as well.

This can be achieved in a particularly effective way when the second aligning means is arranged in a short way upstream of the third jack roller.

According to other preferred embodiments of the invention, hold-back means for the timber products acting in the conveying direction are arranged at the downstream end of the support.

This feature provides the advantage that the flow of timber products along the linear conveyor can be stopped at desire, for example for the purpose of adjusting a subsequent trimming machine.

If, according to a further improvement of this embodiment of the invention, the hold-back means is designed in the form of a frame, in particular one effective at a certain distance above the support, then the hold-back device can be used also for effecting a certain selection within the flow of timber products. In particular, it is possible with the aid of the last-mentioned variant to hold back the second board, whose downstream end overlaps the upstream rear end of the preceding board, in order to ensure that it will safely slide off the preceding board and will not be entrained by the latter in an undesirable way, for example by friction or the like, as this latter board leaves the conveying system according to the invention.

Other advantages of the invention will appear from the specification and the attached drawing.

It is understood that the features that have been described before and will be explained hereafter may be used not only in the described combination, but also in any other combination, or individually, without leaving the scope and intent of the present invention.

Certain embodiments of the invention will now be described in more detail with reference to the drawing in which.

Figure 1:
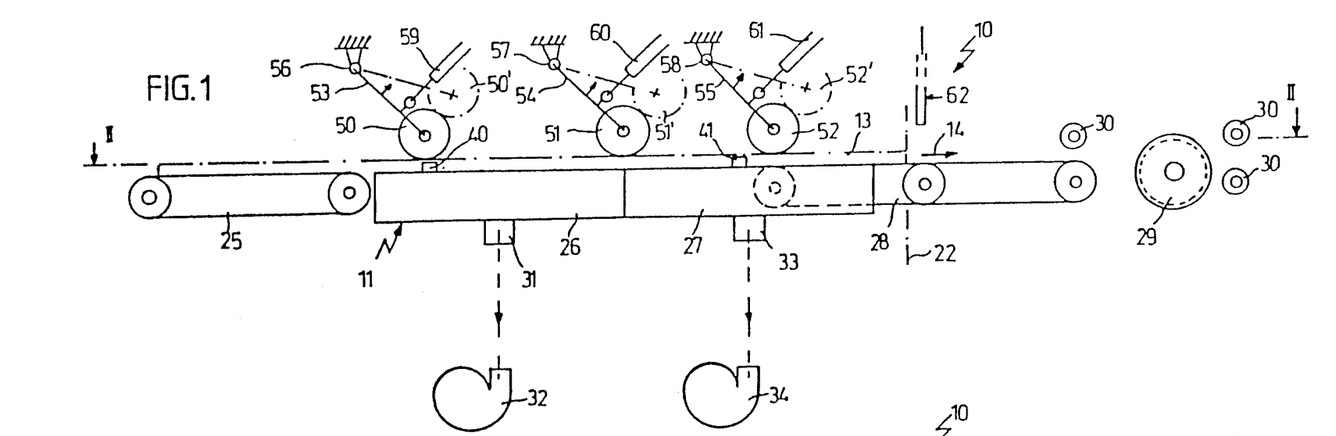
FIG. 1 shows a diagrammatic side view of a first embodiment of a conveyor system according to the invention.
Figure 2:
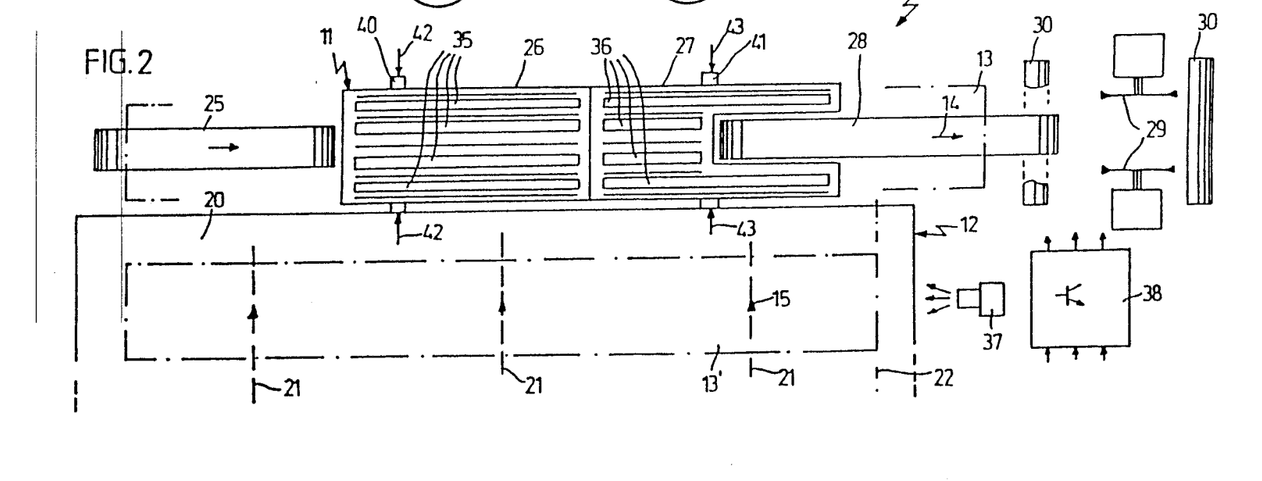
FIG. 2 shows a top view of the conveyor system according to FIG. 1, in the plane identified by II—II in FIG. 1.

Regarding now FIGS. 1 and 2, reference numeral 10 indicates a feeding system for timber products having at least one flat side, in particular for boards.

The feeding device 10 comprises a linear conveyor 11 as well as a transverse conveyor 12 intended for conveying boards 13. The feeding sense of the linear conveyor 11 is indicated by 14, the feeding sense of the transverse conveyor 12 by 15. It will be appreciated that the feeding senses 14, 15 enclose between them an angle of 90°.

The boards 13 arriving from a unit arranged a certain distance away in upstream direction, and not illustrated in FIG. 2, are transported on a table 20 of the transverse conveyor 12 with their longitudinal extension in forward direction. This is achieved with the aid of conveyor belts 21, or the like, arranged in the table 20 by means of which the boards 13 can be transported in the feeding direction 15 of the transverse conveyor 12. The boards 13 are aligned on the transverse conveyor 12 in such a way that their right ends, as viewed in FIG. 2, are lined up along a line fixed in space, i.e. a so-called timber line 22.

In FIG. 2, the board that has already been transferred to the linear conveyor 11 is indicated by 13, the next board, i.e. the one still lying on the transverse conveyor 12, is indicated by 13'.

The linear conveyor 11 comprises, at its upstream end, a first belt conveyor 25 which is followed in the feeding direction by a support, preferably a first vacuum box 26 and a second vacuum box 27. A little further down in downstream direction, there can be seen a second belt conveyor 28 which partially overlaps the second vacuum box 27 in the feeding direction, as can be seen very clearly in FIG. 2.

Another distance further down in downstream direction of the linear conveyor 11, there are arranged circular saws 29 and related rollers 30 in a manner known as such.

The first vacuum box 26 is connected to an exhauster 32, via a connection pipe 31, while the second vacuum box 27 is similarly connected to another exhauster 34, via a connection pipe 33. It is understood in this connection that the number of two vacuum boxes 26, 27 with their related elements, is given only by way of example, it being of course also possible for the vacuum jack means formed by the vacuum boxes 26, 27 to consist of a smaller or else of a greater number of vacuum boxes.

Figure 3:
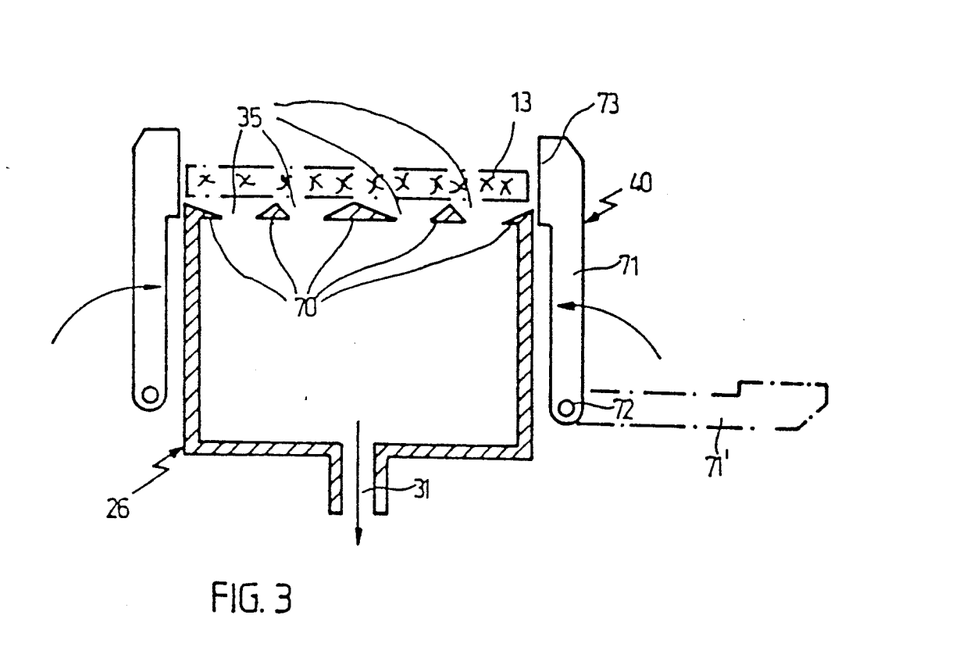
FIG. 3 shows a cross-sectional view in larger scale, taken in a direction perpendicular to the feeding direction, through a vacuum box of a kind suited for being used in connection with a feeding system according to FIGS. 1 and 2.

As appears from FIG. 2, and even more clearly from FIG. 3, the upper faces of the vacuum boxes 26, 27 are provided with intake slots 35, 36 by means of which the boards 13 can be held down through the vacuum, in contact with the tops of the vacuum boxes 26, 27.

FIG. 2 further shows a surface camera indicated by 37 which serves for detecting the arriving boards 13'. A sequence control unit 38, shown extremely diagrammatically in FIG. 2, serves for controlling all units of the conveyor system 10. The details of the internal structure and external wiring of the sequence control unit 38 have been omitted in the drawing for the sake of clarity.

The linear conveyor 11 comprises further a rear aligning device 40 and a forward aligning device 41, the rear aligning device 40 being located in the area of the upstream end of the first vacuum box 26, and the forward aligning device 41 being located at about the level of the longitudinal center of the second vacuum box 27.

Arrows 42 and 43 in FIG. 2 indicate the action of the aligning devices 40, 41 which serve for aligning the transferred boards 13 in the area of the linear conveyor 11, according to the latter's feeding direction.

As can be seen best in FIG. 1, a total of three pressure rollers 50, 51, 52 are arranged above the linear conveyor 11. The first pressure roller 50 is located at about the level of the rear aligning device 40, at the upstream end of the first vacuum box 26. The second pressure roller 51 is located at about the longitudinal center of the vacuum jack means formed by the vacuum boxes 26, 27, while the second pressure roller 52 is located a short way before the downstream end of the second vacuum box 27, slightly downstream of the forward aligning device 41.

The pressure rollers 50, 51, 52 are mounted on one end of swinging arms 53, 54, 55, whose other ends are pivoted at stationary points 56, 57, 58. Piston-and-cylinder units 59, 60, 61 serve for swinging the pressure rollers 50, 51, 52 either into their operative positions indicated by full lines in FIG. 1, or in upward direction, into their inoperative positions 50', 51', 52' indicated by dash-dotted lines in FIG. 1. In this inoperative position, the pressure rollers 50', 51', 52' are located at a relatively large distance above the linear conveyor 11 so as to provide lateral access for the boards arriving from the transverse conveyor 12, as will explained in more detail further below by reference to FIGS. 4 to 7.

Further, a hold-back device positioned at about the level of the timber line 22, i.e. at the downstream end of the support formed by the vacuum boxes 26, 27 is indicated by 62 in FIG. 1. This hold-back means will be described in more detail below, by reference to FIG. 6a.

Regarding now once more FIG. 3, certain additional details will be seen, for example that the material bridges remaining between the intake slots 35 take the form of cutter blades 70 so that, consequently, the boards 13 are supported only on narrow edges extending in the conveying direction. It will be appreciated at once that this improves the alignment of the boards 13 on the linear conveyor 11.

It will be further noted from FIG. 3 that the aligning devices, for example the rear aligning device 40, can be designed in a simple manner in the form of swinging arms 71 mounted for being pivoted about a lower axis 72 in a vertical plane perpendicular to the feeding direction of the linear conveyor 11. In the position 71' indicated by dash-dotted lines in FIG. 3, the aligning devices are, therefore, in a position clear of the top of the supporting plane of the linear conveyor 11, formed by the vacuum boxes 26, 27, while in the position indicated by full lines in FIG. 3, they are active to perform their aligning function. To this end, the upper free ends of the swinging arms 71 are provided with jaws 73 capable of acting laterally upon the boards 13 so as to align them on the linear conveyor in longitudinal direction.

Figure 4:
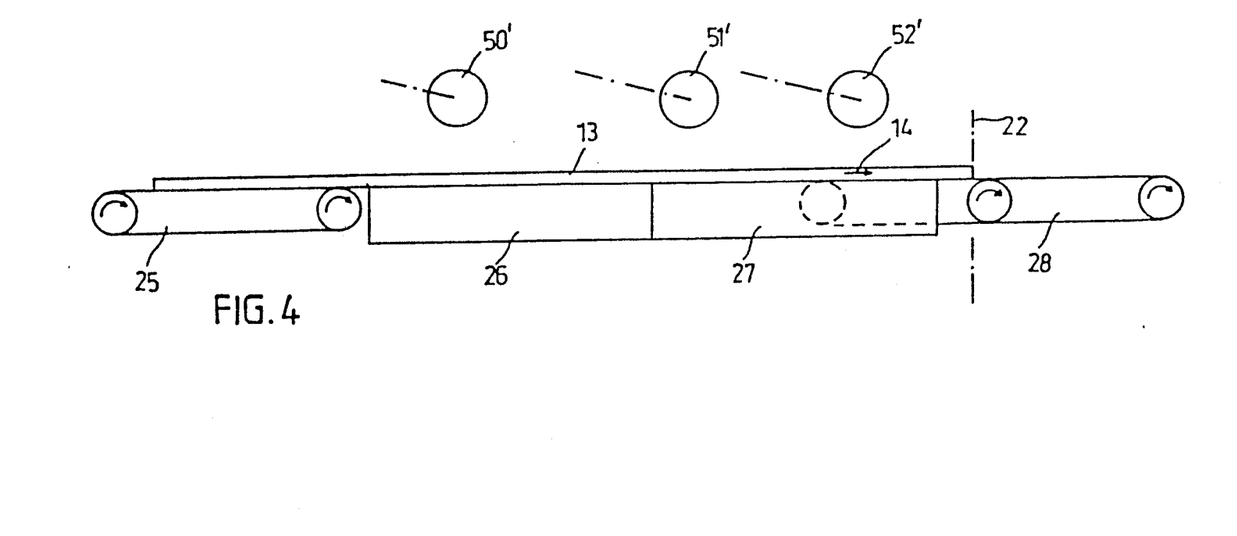
FIGS. 4 to 7 show representations similar to that of FIG. 1, though even more diagrammatic, illustrating different working phases of the embodiment illustrated in FIGS. 1 and 2.

Hereafter, the operation of the conveyor system 10 according to FIGS. 1 to 3 will be described by way of the sequential illustrations of FIGS. 4 to 7:

FIG. 4 illustrates an initial position where the pressure rollers 50', 51' and 52' occupy their upper, inoperative positions. Now, a first board 13 can be transferred from the transverse conveyor 12 in the direction indicated by arrow 15 (FIG. 2) and laterally upon the top of the linear conveyor 11, there being sufficient space above the linear conveyor 11 due to the fact that the pressure rollers 50', 51', 52' have been pivoted into their inoperative positions. The axial position of the board 13 delivered first is defined by the before-mentioned timber line 22 extending approximately at the longitudinal center of the second belt conveyor 28, a short way downstream of the second vacuum box 27.

The board 13 delivered first can be fed on from the position shown in FIG. 4 in the direction indicated by arrow 14 by switching on the belt conveyors 25 and 28, the board 13 being held down conveniently by the vacuum boxes 26, 27 and being grasped at its front and rear ends by the belt conveyors 25, 28.

Figure 5:
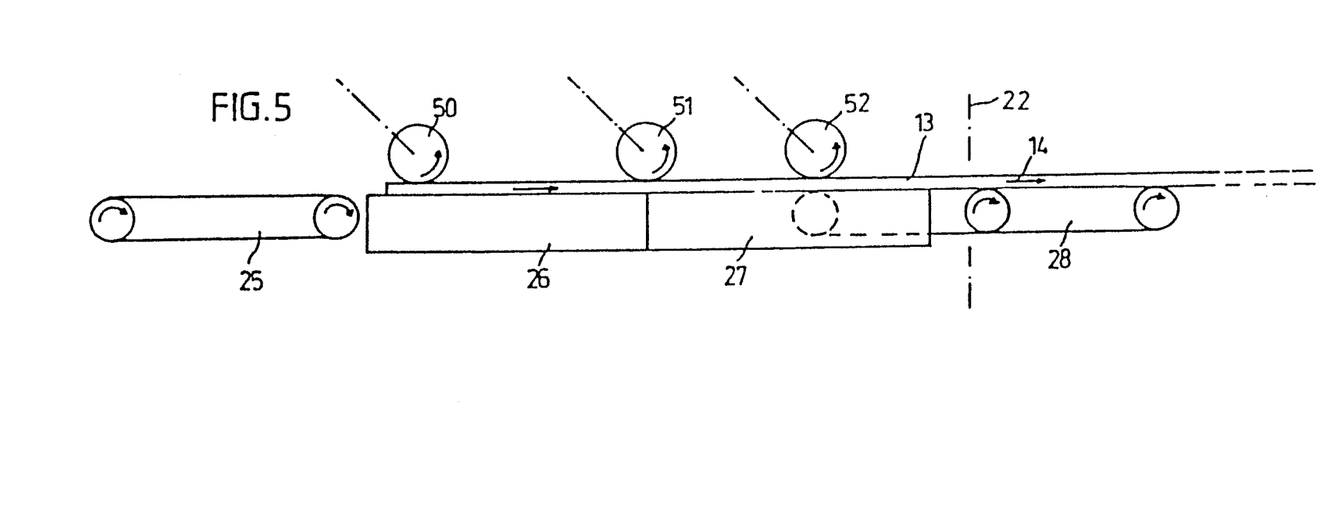

FIG. 5 shows the next operating phase of the conveyor system 10 a short time after the operating phase illustrated in FIG. 4. It can be noted that the board 13 has already been transported a short way in the direction of arrow 14, its rear upstream end having already left the first belt conveyor 25, which is now switched off. In the meantime, the pressure rollers 50, 51, 52 have been pivoted into their lower position in order to hold down and to guide the board 13 on the vacuum boxes 26, 27, and maybe even to drive them if the pressure rollers 50, 51, 52 are equipped with drives of their own.

Figure 6:
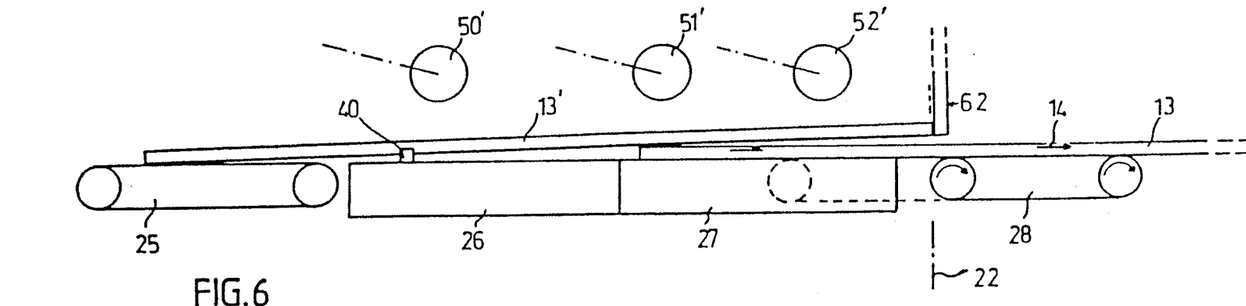

Thereafter, the pressure roller 50, 51, 52 are returned to their upper, inoperative positions 50', 51', 52', as indicated in FIG. 6 which illustrates the next phase in time. There being now sufficient free space above the linear conveyor 11, a second board 13' can be transferred from the transverse conveyor 12 in the direction of arrow 15. The axial position of the second board 13' is again defined by the timer line 22. All this occurs at a time when the first board 13 has not yet left the linear conveyor 11. For, as can be seen very clearly in FIG. 6, the upstream end of the first board 13 is still within the active range of the linear conveyor 11, i.e. is still supported by the upper surface of the second vacuum box 27. The fact that the second belt conveyor 26 extends right into the second vacuum box 27 guarantees that a sufficient feeding action is exerted by the second belt conveyor 28 on the first board 13.

The first belt conveyor 25 being switched off during this phase, the second board 13' is not transported initially. However, the time remaining until the first board 13 has been carried off is already used for swinging the rear aligning device 40 upwardly, and aligning the rear upstream end of the second board 13. As has been mentioned before in connection with FIG. 1, a hold-back device 62, the details of which are indicated diagrammatically in FIG. 6a, may be provided at the end of the support formed by the vacuum boxes 26, 27.

The hold-back device 62 may consist of a plate, a frame, or the like, 62a arranged for being displaced vertically in downward direction toward the supporting plane which is defined by the vacuum boxes 26, 27.

As can be clearly seen in the side view of FIG. 6, it is thus possible to hold back the second board 13' by its leading end so as to prevent it from being entrained by the first board 13 while the latter is carried off underneath it.

It is thus even possible to leave the first conveyor 25 switched on when the operating phase illustrated in FIG. 6 is reached because there is no risk of the board 13' being carried away, even with the first belt conveyor 25 in the switched-on condition.

Once the rear end of the lower board 13 has passed the timber line 22, the leading end of the upper board 13' slides down all by itself and can then be carried off below the hold-back device 62 by the second belt-conveyor 28.

Figure 6A:
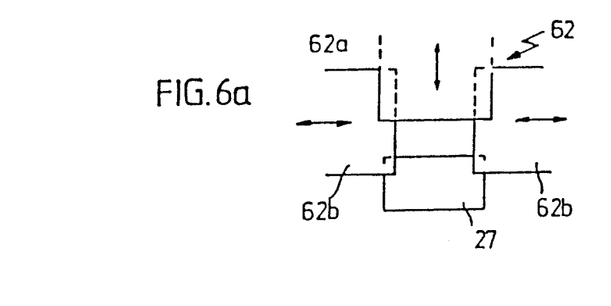

FIG. 6a shows the upper hold-back element 62a as it has been described before. It is understood, however, that the hold-back device 62 may also be designed in the form of a frame comprising additional lateral hold-back elements 62b or an additional lower hold-back element not shown in FIG. 6a so that any clear cross-section can be predetermined for the flow of boards to be permitted to pass or to be held back.

Figure 7:
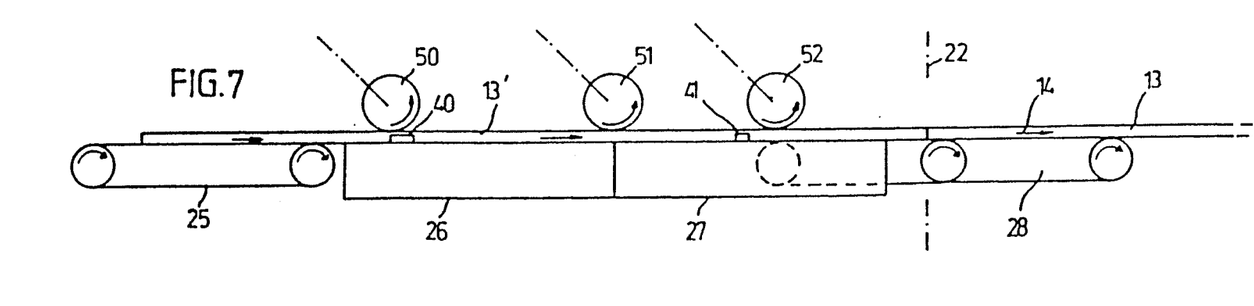

Now, once the rear end of the first board 13 has passed the timber line 22, the leading, downstream end of the second board 13' slides off the first board 13, and the pressure rollers 50, 51, 52 are simultaneously swung down into their lower positions, as indicated in FIG. 7. At the same moment, the forward aligning device 41 is activated in order to align also the leading end of the second board 13'. Simultaneously, the first belt conveyor 25 is switched on again so that the second board 13' is grasped by the belt conveyors 28 and 25, by its leading and rear ends, and is moved along in the direction indicted by arrow 14.

It can be clearly seen in FIG. 7 that the boards 13 and 13' are arranged closely adjacent one to the other in the feeding the direction 14 so as to produce an uninterrupted flow of boards 13 along the linear conveyor 11.

The second board 13' occupies the same position in FIG .7 which the first board 13 occupied in FIG. 4, so that the pressure rollers 50, 51, 52 can be pivoted to their upward positions and the cycle of the operations illustrated in FIGS. 4, 5, 6 and 7 can start anew.

Figure 8:
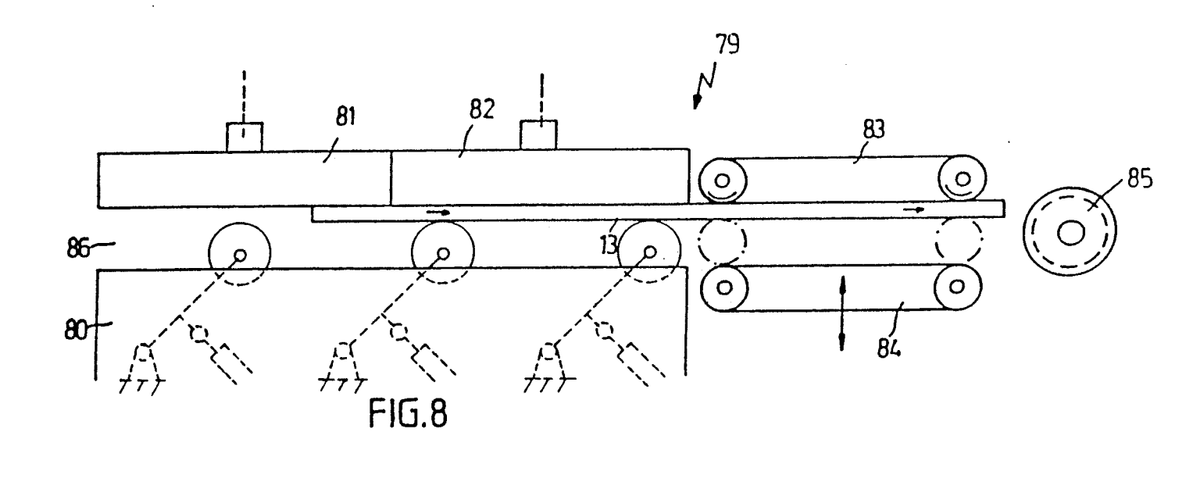
FIG. 8 is a side view of another embodiment of a feeding system according to the invention.

FIG. 8 shows a variant of the conveyor system where the linear conveyor 79 comprises a feeding table 80 with vacuum boxes 81 and 82 arranged above the latter. The vacuum boxes 81, 82 have the same design as the vacuum boxes 26, 27 of the embodiment illustrated in FIGS. 1 to 7, except only that they are arranged upside down, i.e. with their intake side pointing downwardly.

At the downstream end of the vacuum boxes 81, 82, there are located a first stationary belt conveyor 83 and a second belt conveyor 84 arranged for being displaced in vertical direction. The system is followed in the feeding direction by a circular saw 85 of conventional design.

The conveying system illustrated in FIG. 8 differs from that of FIGS. 1 to 7 only insofar as the boards 13 transferred from the transverse conveyor in a direction perpendicular to the drawing plane of FIG. 8 are held down by vacuum acting on their upper face, and carried off by means of a first belt conveyor 83. For the purpose of transferring the boards 13 laterally into the space 86 between the feeding table 80 and the vacuum boxes 81, 82, the second belt conveyor 84 is moved down briefly so as to provide the required clear space. Once the boards 13 have been transferred to the area of the linear conveyor 79, the second belt conveyor 84 is returned to its upper position in vertical direction in order to support the feeding movement of the boards 13 toward the circular saw 85.

It goes without saying that the conveyor system according to FIG. 8 may of course be equipped analogously with all the different units employed in the feeding device 10 according to FIGS. 1 to 7, and that for the purposes of the present invention there is no need to describe all of them once more in full detail.

I claim:

1. An apparatus for conveying timber products having a longitudinal axis and one flat side parallel thereto, said apparatus comprising:
   a transverse conveyor for conveying said timber products in a horizontal plane along a first direction perpendicular to said longitudinal axis thereof;
   a longitudinal conveyor, positioned downstream of said transverse conveyor, for conveying said timber products in a horizontal plane along a second direction perpendicular to said first direction; and
   a transfer station positioned between said transverse conveyor and said longitudinal conveyor for transferring said timber products therebetween, said transfer station having:
      at least one linear conveyor means gripping a downstream end of said timber products;
      at least one support adapted to assist in supporting a middle portion of said timber products from below while said timber products are on said linear conveyor means;
      at least one jack roller for holding down said timber products on said linear conveyor means, said jack rollers being arranged above said support and capable of being pivoted in an upward direction, away from said timber products;
      hold-back means provided at a downstream end, with respect to said second direction, of said support, said holdback means being arranged at a distance above said support and adapted to hold back a downstream end of one of said timber products, in a conveying direction of said longitudinal conveyor, when one of said timber products is lying on a upstream end of a previously conveyed one of said timber products on said support; and
      control means for actuating said transverse conveyor, said linear conveyor means and said jack roller.

2. The apparatus of claim 1, wherein said support takes the form of vacuum jack means for holding down said timber products on said support.

3. The apparatus of claim 2, wherein said vacuum jack means is designed as vacuum boxes having upper faces and intake slots therein.

4. The apparatus of claim 3, wherein said intake slots are separated from each other by means of axial cutter blades for supporting said timber products.

5. The apparatus of claim 1, wherein said longitudinal conveyor comprises a linear conveyor device adjacent said transfer station for gripping an upstream end of said timber products.

6. The apparatus of claim 1, wherein said support and said linear conveyor means overlap each other in said second conveying direction of said longitudinal conveyor.

7. The apparatus of claim 1, wherein a first one of said at least one jack roller is provided at an upstream end of said support.

8. The apparatus of claim 7, wherein a second one of said at least one jack roller is provided in a center position above said support.

9. The apparatus of claim 8, wherein a third one of said at least one jack roller is provided at a downstream end of said support.

10. The apparatus of claim 1, wherein said longitudinal conveyor is provided with aligning means for aligning said timber products on said longitudinal conveyor.

11. The apparatus of claim 10, wherein said support takes the form of vacuum jack means for holding down said timber products on said support and a first aligning device is arranged at an upstream end of said vacuum jack means.

12. The apparatus of claim 11, wherein a second aligning device is arranged at a downstream end of said vacuum jack means.

13. The apparatus of claim 12 wherein said second aligning device is arranged in proximity to, and upstream of a said at least one jack roller, which is provided at a downstream end of said support.

14. The apparatus of claim 1, wherein said hold-back means is designed as a frame.

15. An apparatus for conveying timber products having a longitudinal axis and at least one flat side parallel to said longitudinal axis, said apparatus comprising:
   a transverse conveyor for conveying said timber products in a horizontal plane along a first direction perpendicular to said longitudinal axis thereof;
   a longitudinal conveyor downstream said transverse conveyor for conveying said timber products in a horizontal plane along a second direction perpendicular to said first direction; and
   a transfer station arranged between said transverse conveyor and said longitudinal conveyor for transferring said timber products therebetween, said transfer station having:
      at least one linear conveyor means for gripping a downstream end of said timber products;
      at least one vacuum holding means for acting on a middle portion of the said timber products from above;
      at least one pressure roller arranged for being pivoted away from said timber product in a downward direction from below the middle portion of the timber product; and
      control means for actuating said transverse conveyor, said linear conveyor means and said pressure roller.

* * * * *